US011335370B2

(12) United States Patent
Zheng et al.

(10) Patent No.: US 11,335,370 B2
(45) Date of Patent: May 17, 2022

(54) POSITIONING METHOD AND DEVICE FOR HOLOGRAM IN CARD-TYPE HOLOGRAPHIC STORAGE MEDIUM

(71) Applicant: Amethystum Storage Technology Co., Ltd., Guangdong (CN)

(72) Inventors: Mu Zheng, Guangdong (CN); Tiewei Luo, Guangdong (CN); Jun Tian, Guangdong (CN); Dejiao Hu, Guangdong (CN); Yicheng Liu, Guangdong (CN)

(73) Assignee: Amethystum Storage Technology Co., Ltd., Guangdong (CN)

( * ) Notice: Subject to any disclaimer, the term of this patent is extended or adjusted under 35 U.S.C. 154(b) by 0 days.

(21) Appl. No.: 17/152,490

(22) Filed: Jan. 19, 2021

(65) Prior Publication Data
US 2021/0225403 A1 Jul. 22, 2021

(30) Foreign Application Priority Data

Jan. 21, 2020 (CN) .......................... 202010071217.7

(51) Int. Cl.
*G11B 7/0065* (2006.01)
(52) U.S. Cl.
CPC .................................. *G11B 7/0065* (2013.01)
(58) Field of Classification Search
None
See application file for complete search history.

(56) References Cited

U.S. PATENT DOCUMENTS

| 5,438,439 A * | 8/1995 | Mok | G03H 1/26 |
| | | | 359/10 |
| 7,187,481 B1 * | 3/2007 | Sigel | G03H 1/20 |
| | | | 359/10 |
| 2002/0051419 A1 * | 5/2002 | Itoh | G03H 1/2286 |
| | | | 369/103 |

(Continued)

FOREIGN PATENT DOCUMENTS

JP        2000019938 A  *  1/2000

OTHER PUBLICATIONS

Machine Translation of Okubo, JP-2000019938-A, published Jan. 2000.*

*Primary Examiner* — Peter Vincent Agustin
(74) *Attorney, Agent, or Firm* — Muncy, Geissler, Olds & Lowe, P.C.

(57) ABSTRACT

The invention relates to a positioning method and device for a hologram in a card-type holographic storage medium, which can be used for beam positioning of cross-shift multiplexing and belong to the technical field of optical holographic storage. A guide groove in a grid shape is engraved on a card-type storage medium, and is provided with positioning markers. Each marker includes position information and direction information, can control an optical head to move along the guide groove, and shift multiplexing/reproducing is performed when recognizing the positioning markers. Since the card-type medium is adopted, a 90-degree rotation can be executed three times, and a total of four times of shift multiplex recording is performed. Random access can be achieved even in a medium that is rotated and used by adopting the positioning method and device described in the present invention.

17 Claims, 7 Drawing Sheets

(56) References Cited

U.S. PATENT DOCUMENTS

| | | | | |
|---|---|---|---|---|
| 2002/0075776 | A1* | 6/2002 | Kasazumi | G11B 7/1374 369/47.5 |
| 2004/0190095 | A1* | 9/2004 | Minabe | G11B 7/0065 359/29 |
| 2005/0185231 | A1* | 8/2005 | Chuang | G11B 7/007 359/3 |
| 2005/0264860 | A1* | 12/2005 | Toishi | G11B 7/0065 359/22 |
| 2005/0270609 | A1* | 12/2005 | Chuang | G11B 7/28 359/22 |
| 2006/0039047 | A1* | 2/2006 | Someno | G03H 1/26 359/24 |
| 2008/0037085 | A1* | 2/2008 | Gabor | G11B 7/1381 359/24 |
| 2008/0285395 | A1* | 11/2008 | Tanaka | G11B 7/1275 369/44.23 |
| 2009/0161519 | A1* | 6/2009 | Yamamoto | G11B 7/0065 369/103 |
| 2009/0303856 | A1* | 12/2009 | Kadowaki | G11B 7/00781 369/103 |
| 2014/0064049 | A1* | 3/2014 | Fujita | G11B 7/0917 369/47.49 |
| 2021/0201950 | A1* | 7/2021 | Zheng | G11B 7/083 |
| 2021/0225402 | A1* | 7/2021 | Zheng | G11B 7/127 |
| 2021/0225403 | A1* | 7/2021 | Zheng | G11B 7/083 |
| 2021/0233568 | A1* | 7/2021 | Zheng | G11B 7/14 |

* cited by examiner

POSITIONING METHOD AND DEVICE FOR HOLOGRAM IN CARD-TYPE HOLOGRAPHIC STORAGE MEDIUM

CROSS REFERENCE TO RELATED APPLICATIONS

The present application claims priority from Chinese Patent Application No. 202010071217.7 filed on Jan. 21, 2020, all of which are hereby incorporated herein by reference.

TECHNICAL FIELD

The invention relates to the technical field of optical holographic storage, in particular to a positioning method and device for a hologram in a card-type holographic storage medium.

BACKGROUND ART

A spherical reference beam shift multiplex storage method records a hologram using a spherical wave as a reference beam. When the reference beam is the spherical wave, the hologram cannot be reproduced by simply shifting a small distance, and then a new hologram can be recorded at that position, which is repeated multiple times, and this method is called shift multiplex recording. In this method, shift selectivity in an axis direction is determined by Bragg conditions. However, a diffracted intensity is not sensitive to a shift distance in the direction perpendicular to the axis direction, and it is difficult to increase storage density. Therefore, a cross-shift multiplex recording method is employed to increase the storage density, which is a method of increasing a multiplexing number by cross-shift multiplex recording on a plane.

The present invention provides a method and a device for marking and positioning a beam position when performing the cross-shift multiplex recording on a card-type medium.

SUMMARY OF THE INVENTION

The present invention aims to overcome at least one of the deficiencies in the prior art, provides a positioning method and device for a hologram in a card-type holographic storage medium, and provides a storage medium, thereby marking and positioning a beam position when performing cross-shift multiplex recording, improving recording/reading speed of a system to enable random recording/reading.

The positioning method for the hologram in the card-type holographic storage medium provided by the present invention is used to position a recording/reproducing beam when recording/reproducing the hologram, and takes markers provided on a guide groove of the storage medium as a starting position of recording/reproducing. When the recording/reproducing is performed, the recording/reproducing beam is positioned first with a positioning beam detection marker, and shift multiplex recording/reproducing is performed from detecting the marker.

The guide groove is in a two-dimensional grid shape, the markers are located at a crossing of a two-dimensional grid, each marker includes at least optical track information and sector information, and the recording/reproducing beam is positioned to a target marker according to the optical track information and the sector information.

In addition to the above information, rotation angle information is recorded in advance in an area other than the marker and/or a recording/reproducing area, and cross-shift multiplex recording/reproducing is performed according to the rotation angle information.

In order to quickly find the marker, two-dimensional coordinate information is recorded in advance with marker positions in an area other than the recording/reproducing area.

The rotation angle information includes an address set in a storage medium moving direction x and an address set in a y direction perpendicular to the storage medium moving direction x, the addresses set in the x direction and the y direction are different, and a rotational angle of the storage medium is determined according to the addresses in the x direction and the y direction.

The address includes a plurality of patterns, and when recording/reproducing data, firstly a positioning beam is used to read deviation signals formed by the patterns in the x direction and the y direction to detect whether a recording/reading position is correct, a recording/reading beam is controlled to a correct position according to a position deviation signal, and then recording/reading of the data is started.

The correct position is the guide groove or the marker, position deviation is obtained by comparing a light intensity difference of the patterns in the x direction and the y direction respectively, and the light intensity difference on the guide groove or the marker is 0 or a preset value.

The positioning beam used in the present invention is a reference beam or a beam from a light source different from that of the reference beam.

The present invention also provides the card-type holographic storage medium, in which the guide groove is engraved in the recording/reproducing area of the storage medium, and the guide groove is provided with markers at a same interval.

The guide groove is in the two-dimensional grid shape, and the markers are located at the crossing of the two-dimensional grid.

The rotation angle information is recorded in advance in the area other than the marker and/or the recording/reproducing area, and the cross-shift multiplex recording/reproducing is performed according to the rotation angle information.

The two-dimensional coordinate information is recorded in advance with the marker positions in the area other than the recording/reproducing area.

The rotation angle information includes an address set in a storage medium moving direction x and an address set in a y direction perpendicular to the storage medium moving direction x, and the address includes a plurality of patterns.

A positioning device for the hologram in the card-type holographic storage medium provided by the present invention, including: a first optical system for recording/reproducing information; a translation stage supporting the translation of the storage medium engraved with the guide groove provided with markers in the recording/reproducing area; and a second optical system for generating the positioning beam used to position the recording/reading beam generated by the first optical system, in which the recording/reproducing beam and the positioning beam act on the same position of the storage medium, and recording/reproducing is performed by adopting the positioning beam to position the recording/reproducing beam at a specific position of the storage medium.

The positioning device further includes a comparator for comparing the position deviation signal read by the positioning beam from a specific position on the storage medium, and driving the translation stage to support the translation of the storage medium according to the deviation signals, so that the positioning beam and the recording/reproducing beam are located at a recording/reproducing position.

The position deviation signal is the light intensity difference of the same pattern at a specific position of the storage medium.

The translation stage includes an x-direction translation mechanism and a y-direction translation mechanism, in which the x-direction translation mechanism is used for controlling the translation stage to support the storage medium to translate in a shift multiplex moving direction of the storage medium, and the y-direction translation mechanism is used for controlling the translation stage to support the storage medium to translate in a direction perpendicular to the x direction, so that the positioning beam and the recording/reproducing beam are located on the guide groove or the markers.

The x-direction translation mechanism includes a stepper translation mechanism that controls the translation stage to control the storage medium to translate in the x direction taking a distance moved by holographic storage shift multiplexing as a stepper distance.

The translation stage also includes a preliminary positioning mechanism that controls the movement of the storage medium such that the positioning beam and the recording/reproducing beam are located at a specific position of the storage medium.

The preliminary positioning mechanism includes a translation and/or rotation and/or inversion positioning mechanism, and can be used for realizing hologram multiplex recording/reproducing after translation, rotation and inversion of a storage device.

Compared with the prior art, the beneficial effects of the present invention are as follows. When an optical head accesses the recording/reproducing area of the medium at a high speed, the positioning beam is moved along the guide groove previously engraved in a medium, and the shift multiplex recording/reproducing is performed from detecting a positioning marker. Beam positioning can use the same laser light source as that of the recording/reproducing beam, and also can use a different light source. The positioning beam and the recording/reproducing beam are applied to the same position in the medium, the positioning beam controls the recording/reproducing beam to move along the guide groove, and the markers are provided on the guide groove. Beam control can include focus control and track control.

Generally, a cross-shift multiplex recording method rotates the medium to perform overwritten cross-shift multiplex recording. Since the present invention adopts a card-type medium, a 90-degree rotation can be executed three times, and a total of four times of shift multiplex recording is performed. According to the present invention, random access can be achieved even in the medium that is rotated and used. The present invention is described only for the case of 90-degree rotation, but the basic concept is the same for other rotational angles.

Reference Numerals: a holographic storage medium is an optical disk 100; a first optical system 200 includes a first laser 11, a beam expander 20, a first half-wave plate 31, a first polarizing beam splitter prism 41, a spatial light modulator 50, a first mirror 61, a first relay lens group 71, a second polarizing beam splitter prism 42, a second mirror 62, a depolarizing beam splitter prism 80, a second half-wave plate 32, a first Fourier lens 91, and a third Fourier lens 93; a second optical system includes a second laser 12 and a second relay lens group 72; a comparator 500 includes a second Fourier lens 92 and a two-divided photoelectric sensor 110; and a reproducing apparatus 400 includes a fourth Fourier lens 94 and a high-speed camera 120.

EMBODIMENTS

The drawings of the present invention are for illustration purpose only and are not intended to limit the present invention. Some components in the drawings may be omitted, enlarged, or reduced for better illustrating the embodiments, and sizes of these components do not represent sizes of actual products. For those skilled in the art, it will be understood that some known structures in the drawings and descriptions thereof may be omitted.

Embodiment 1

Figure 1:
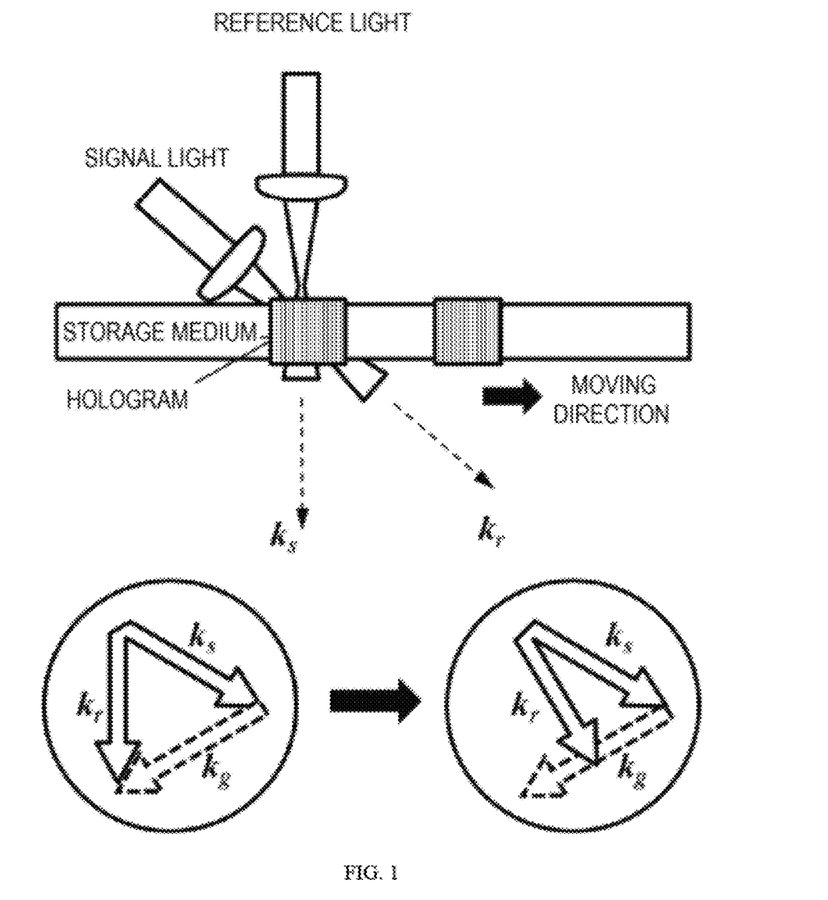
FIG. 1 is a principle diagram of a shift multiplex recording.
Figure 2:
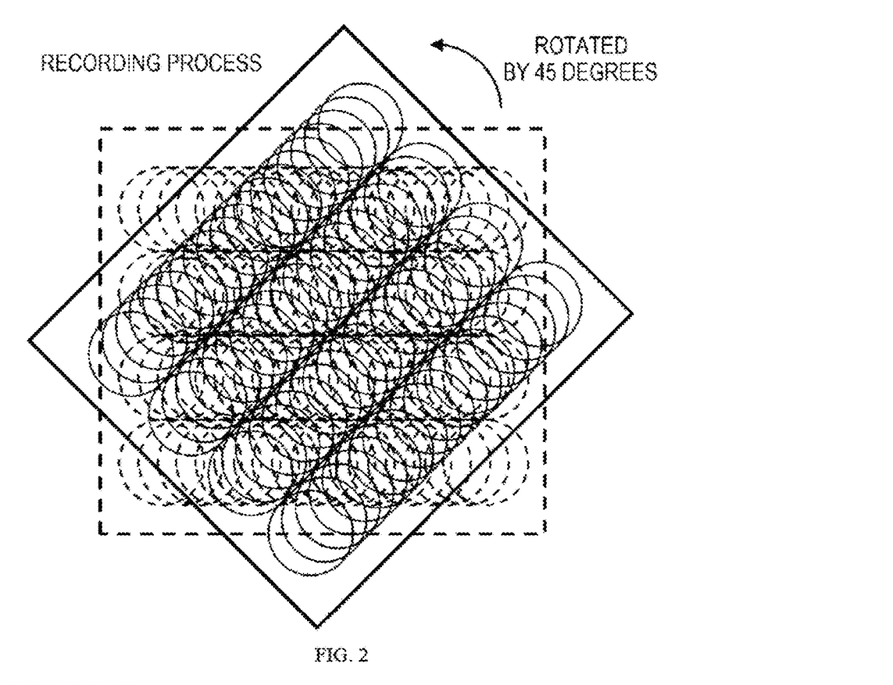
FIG. 2 is a principle diagram of a cross-shift multiplex recording.

A holographic multiplex recording method in Embodiment 1 is shown in FIG. 1, which is a method of repeatedly performing shift multiplex recording/reproducing of a hologram using a spherical reference wave in an axis direction. If a medium is moved a slight distance after the hologram is recorded, the hologram will not be reproduced, and at this time a new hologram can be recorded for shift multiplexing. Specifically, when the medium is moved by several microns, Bragg conditions formed by a signal light, a reference light, and a grating vector are broken, and the hologram cannot be reproduced. However, the amount of shift for a reproduction light to disappear in a specific axis direction is a slight distance, meaning that the shift selectivity is strong, and the shift selectivity in the direction perpendicular to the specific axis direction is extremely weak. Therefore, high density recording is impossible. Thus, a cross-shift multiplex recording method shown in FIG. 2 is employed. The method includes the following steps: firstly performing two-dimensional shift multiplex recording in the specific axis direction; and then performing a second overwritten shift multiplex recording by rotating the medium on a medium plane, which are repeated multiple times. This method is called cross-shift multiplex recording, which solves the problem that a multiplexing number is insufficient in a spherical wave shift multiplex recording method.

In the process of cross-shift multiplex recording, the hologram having a diameter of 1 mm is recorded in a multiplex manner with a shift pitch of about 5 um in an x direction (horizontal direction) and a shift pitch of 250 um to 500 um in a y direction (vertical direction). To further increase the multiplexing number, the medium is rotated by 90 degrees and the same multiplex recording is performed, in which the 90-degree rotation can be executed three times, and a total of four times of overwritten shift multiplex recording is performed. Embodiment 1 describes a movement and a positioning method of the medium, which is achieved by a relative movement of the medium and an optical system.

Figure 3:
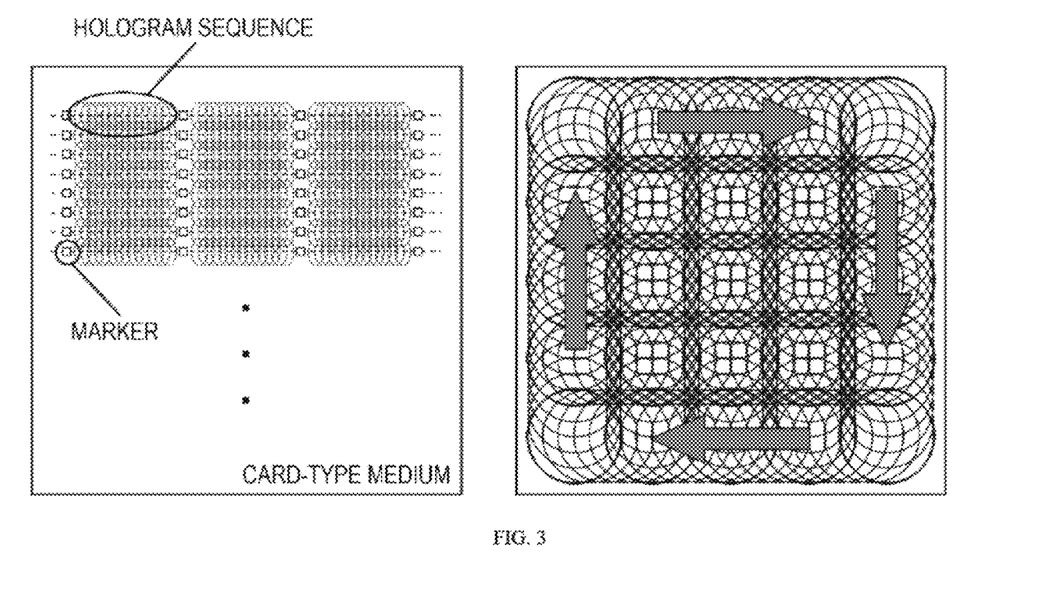
FIG. 3 is a principle diagram of the cross-shift multiplex recording in a card-type storage medium.

The positioning method for the hologram in a card-type holographic storage medium provided by the present invention is shown in FIG. 3. A guide groove in a two-dimensional grid shape is provided on the storage medium, and a marker is provided at the crossing of a two-dimensional grid and is taken as a starting position of recording/reproducing. When the recording/reproducing is performed, a recording/reproducing beam is positioned first with a positioning beam detection marker, and the shift multiplex recording/reproducing is performed from detecting the marker. A shift multiplex recording process is controlled by detecting a marker position.

Each marker includes at least optical track information and sector information, and the recording/reproducing beam is positioned to a target marker according to the optical track information and the sector information.

Figure 4:
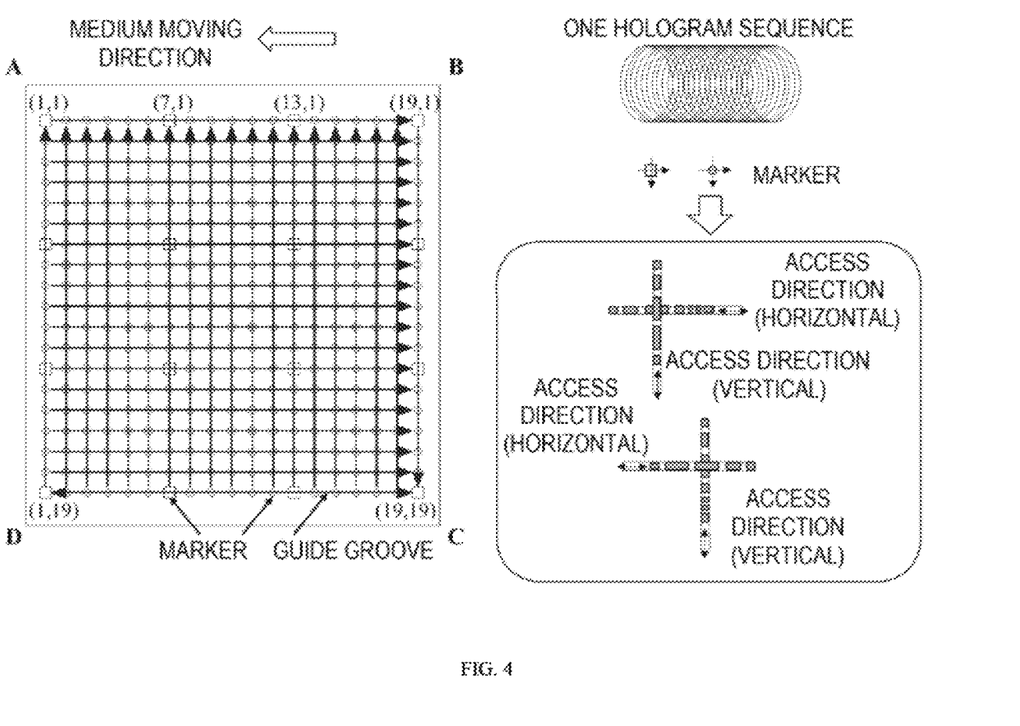
FIG. 4 is a schematic diagram of arranging marker positions when performing the cross-shift multiplex recording in the card-type storage medium.

FIG. 4 shows a marker format and additional information of a specific marker. The marker is two-dimensionally arranged on a medium card, and has a structure in which position information can be recognized in a medium access direction (x direction, horizontal direction) and a direction (y direction, vertical direction) perpendicular thereto. The medium is overwritten by being rotated every 90 degrees, the rotational angle needs to be positioned, so that the marker structure has additional information describing different rotational angles. The width of the marker is 1 um or less, which can be detected by irradiating a reference light having a wavelength of 405 nm or a red semiconductor laser having a wavelength of 630 nm. Such a marker configuration is intended to enable random access in all states.

Specifically, rotation angle information is recorded in advance in an area other than the marker and/or a recording/reproducing area, and cross-shift multiplex recording/reproducing is performed according to the rotation angle information. In order to quickly position the marker, two-dimensional coordinate information is recorded in advance with marker positions in the area other than the recording/reproducing area.

Figure 5:
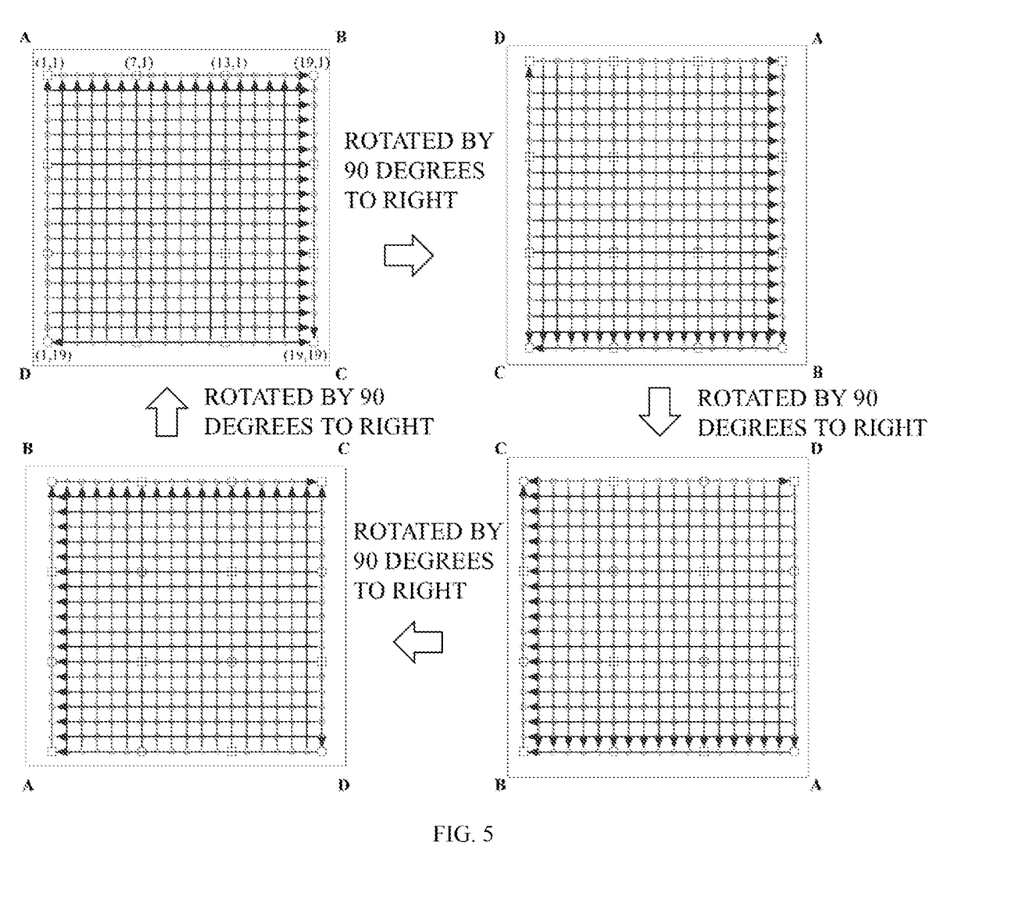
FIG. 5 is a schematic diagram of the marker positions after a 90-degree rotation of the card-type storage medium.
Figure 6:
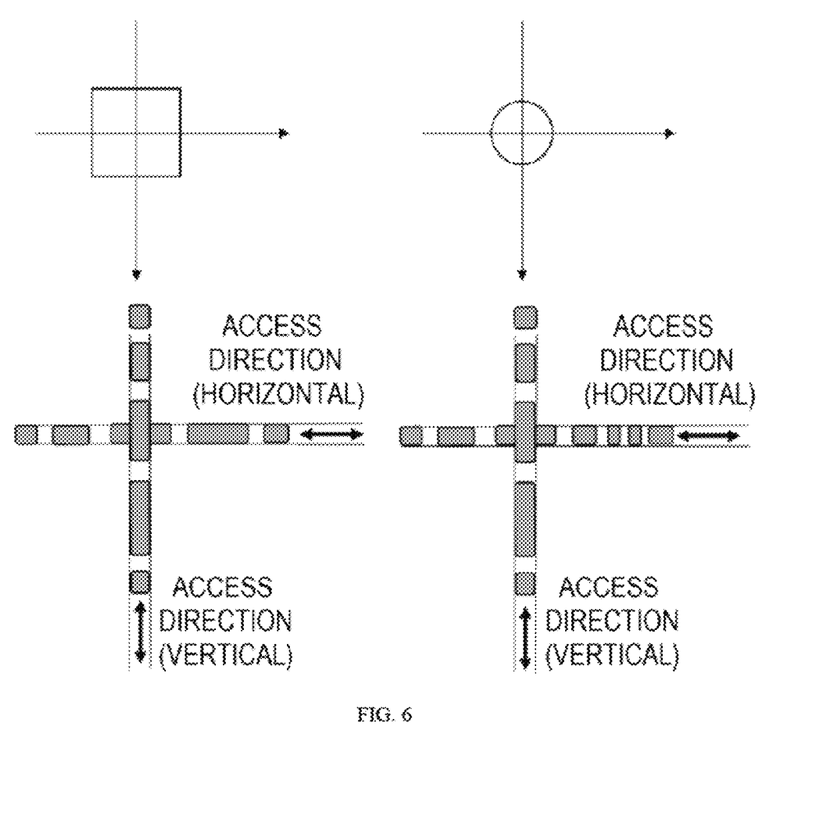
FIG. 6 is a principle diagram of a marker address addition method.

The rotation angle information includes an address set in a storage medium moving direction x and an address set in a y direction perpendicular to the storage medium moving direction x, the addresses set in the x direction and the y direction are different, and a rotational angle of the storage medium is determined according to the addresses in the x direction and the y direction. The specific arrangement of marks at different rotational angles is shown in FIG. 5, the movement of the medium includes an x-axis (horizontal direction) movement, a y-axis (vertical direction) movement, and a rotational movement that rotates every 90 degrees. FIG. 6 shows that all the markers have position information in horizontal and vertical access directions, and the rotational angle of the medium can be recognized by the arrangement of the markers. A position where the horizontal and vertical lines intersect must be a pattern that is not erroneously recognized.

Figure 7:
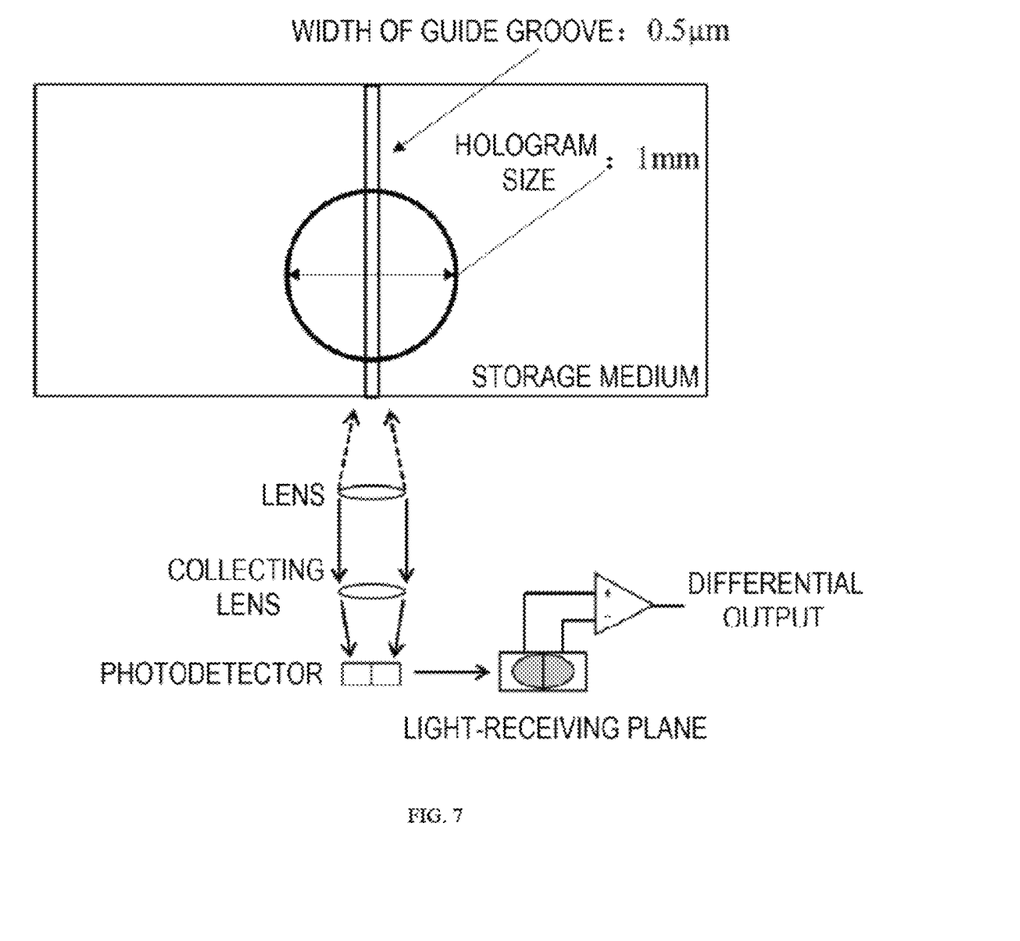
FIG. 7 is a principle diagram of a marker detection method.

The address includes a plurality of patterns, and when recording/reproducing data, firstly a positioning beam is used to read deviation signals formed by the patterns in the x direction and the y direction to detect whether a recording/reading position is correct, a recording/reading beam is controlled to a correct position according to a position deviation signal, and then recording/reading of the data is started. The correct position is the guide groove or the marker, position deviation is obtained by comparing a light intensity difference of the patterns in the x direction and the y direction respectively, and the light intensity difference on the guide groove or the marker is 0 or a preset value. FIG. 7 shows a signal detection method of the guide groove or the marker. The method uses a two-divided photodetector to detect the position deviation and determine whether the position of the positioning beam is correct, and control the storage medium to move such that the positioning beam is located at the correct position.

As shown in FIG. 7, the width of the guide groove in Embodiment 1 is usually in a range of 0.5 um to 1 um, which is sufficiently smaller than the hologram size of 1 mm, so that an influence on the hologram reproduction signal is almost negligible.

The positioning beam in Embodiment 1 is a reference beam or a beam from a light source different from that of the reference beam.

Embodiment 2

According to Embodiment 2, a card-type holographic storage medium is provided. As shown in FIG. 4, a guide groove is engraved in a recording/reproducing area of a storage medium, and the guide groove is provided with markers at a same interval. The guide groove is in the two-dimensional grid shape, and the markers are located at the crossing of the two-dimensional grid.

Each marker includes at least optical track information and sector information, rotation angle information is recorded in advance in an area other than the marker and/or the recording/reproducing area, two-dimensional coordinate information is recorded in advance with marker positions in the area other than the recording/reproducing area. Specifically, the optical track information includes information of the guide groove and the markers.

The rotation angle information includes an address set in a storage medium moving direction x and an address set in a y direction perpendicular to the storage medium moving direction x, and the address includes a plurality of patterns.

The positioning method described in Embodiment 1 can be implemented on the card-type holographic storage medium described in Embodiment 2.

Embodiment 3

Figure 8:
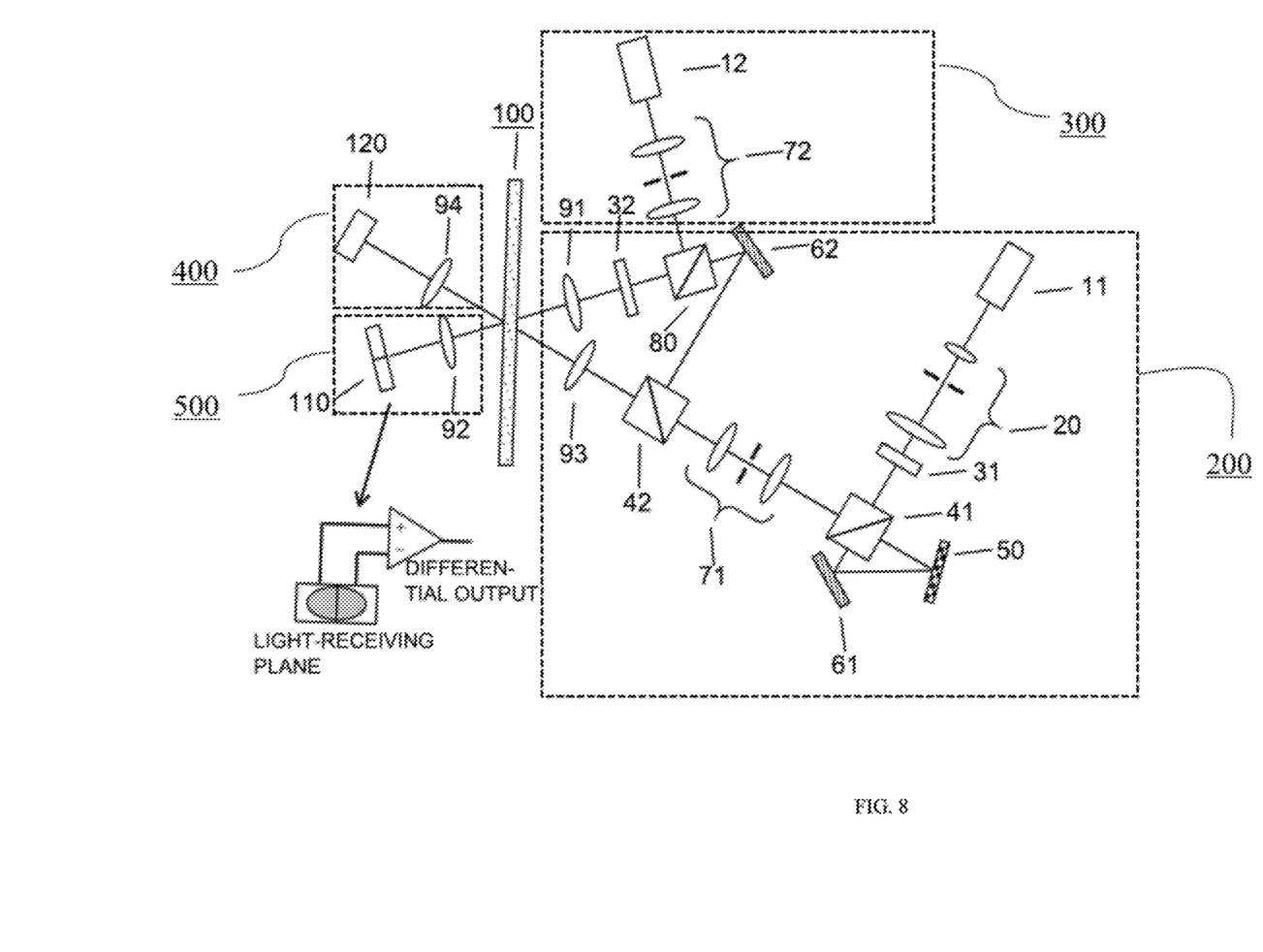
FIG. 8 is a diagram of an optical system for the cross-shift multiplex recording.

As shown in FIG. 8, Embodiment 3 provides {2}{3} a positioning device for a hologram in a card-type holographic storage medium, including: a first optical system 200 for recording/reproducing information and generating a recording/reading beam; a translation stage (not shown) for supporting the translation of a storage medium 100 engraved with a guide groove provided with markers in a recording/reproducing area; and a second optical system 300 for generating a positioning beam used to position the recording/reading beam, in which a recording/reproducing beam and the positioning beam act on the same position of the storage medium, and recording/reproducing is performed by adopting the positioning beam to position the recording/reproducing beam at a specific position of the storage medium.

Specifically, as shown in FIG. 8, a light emitted from a first laser 11 passes through a beam expander 20 and a first half-wave plate 31, and is split by a first polarizing beam splitter 41 into a reflected reference beam with vertical polarization and a transmitted signal beam with horizontal polarization. The transmitted signal beam is reflected by a first mirror 61 and loaded into a spatial light modulator 50 with an input modulated signal. The signal beam after modulation is incident again on the first polarizing beam splitter 41 and converges with the reflected reference beam, both of which then pass through a first relay lens group 71 and a low pass filter. A signal light and a reference light are then separated by a second polarizing beam splitter 42 and led to a signal light channel and a reference light channel respectively. The signal light is converged on the storage medium 100 by a third Fourier lens 93. The reference light passes through a second mirror 62 and a depolarizing beam splitter prism 80, adjusts a polarization direction to a horizontal direction through a half-wave plate 32, and is incident on the same position of the storage medium 100 through a first Fourier lens 91. Then the reference light interferes with the signal light to form the hologram.

The positioning device further includes a comparator 500. During a recording/reproducing process, the detected information is fed back by the positioning beam to a two-divided photoelectric sensor 110. The comparator 500 is used for comparing a position deviation signal read by the positioning beam from a specific position of the storage medium, and driving the translation stage to support the translation of the storage medium according to deviation signals, so that the positioning beam and the recording/reproducing beam are located at a recording/reproducing position. The position deviation signal is a light intensity difference of the same pattern at a specific position of the storage medium. The comparator described in Embodiment 3 is a two-divided photodetector.

The translation stage includes an x-direction translation mechanism and a y-direction translation mechanism, in which the x-direction translation mechanism is used for controlling the translation stage to support the storage medium to translate in a shift multiplex moving direction of the storage medium, and the y-direction translation mechanism is used for controlling the translation stage to support the storage medium to translate in a direction perpendicular to the x direction, so that the positioning beam and the recording/reproducing beam are located on the guide groove or the markers.

To achieve cross-shift multiplexing, the x-direction translation mechanism includes a stepper translation mechanism that controls the translation stage to support the storage medium to translate in the x direction taking a distance moved by holographic storage shift multiplexing as a stepper distance.

The translation stage also includes a preliminary positioning mechanism that controls the movement of the storage medium such that the positioning beam and the recording/reproducing beam are located at a specific position of the storage medium.

The preliminary positioning mechanism includes a translation and/or rotation and/or inversion positioning mechanism, an optical head is placed at a specific position, and the cross-shift multiplexing is started.

The present embodiment also includes a reproducing apparatus 400 for receiving a reproduction light and displaying data information when the hologram is reproduced.

Obviously, the above embodiments of the present invention are merely examples for clear illustration of the technical solution in the invention, and are not intended to limit the implementations of the present invention. Any modification, equivalent substitution or improvement and the like within the spirit and principle of the claims of the present invention should be included in the scope of claims of the present invention.

The invention claimed is:

1. A positioning method for a hologram in a card-type holographic storage medium, comprising recording a guide groove on a recording area of a card-type storage medium in a manner of two-dimensional grid pattern in order to achieve cross-shift multiplex recording, wherein the guide groove is in a two-dimensional grid shape and is provided with markers, each marker is located at a crossing of the two-dimensional grid, each marker includes at least optical track information and sector information, and the positioning method further comprises positioning the recording/reproducing beam to a target marker according to the optical track information and the sector information.

2. The positioning method according to claim 1, wherein rotation angle information for recording/reproducing and two-dimensional coordinate information for marker positions are recorded in advance in an area other than a recording/reproducing area.

3. The positioning method according to claim 1, wherein each marker has an address in a medium access direction and a direction orthogonal thereto.

4. The positioning method according to claim 1, wherein each marker is embedded in a recording medium or a substrate in advance.

5. The positioning method according to claim 1, wherein the marker is detected by a reference light or a beam from a different light source.

6. A positioning method for a hologram in a card-type holographic storage medium used to position a recording/reproducing beam when recording/reproducing the hologram, comprising taking markers provided on a guide groove of a storage medium as starting positions of recording/reproducing, positioning the recording/reproducing beam firstly with a positioning beam detection marker when recording/reproducing is performed, and performing shift multiplex recording/reproducing when detecting the marker,
wherein the guide groove is in a two-dimensional grid shape, each marker is located at a crossing of the two-dimensional grid, each marker includes at least optical track information and sector information, the positioning method further comprises positioning the recording/reproducing beam to a target marker according to the optical track information and the sector information.

7. The positioning method according to claim 6, wherein rotation angle information is recorded in advance in an area other than the marker and/or a recording/reproducing area, and cross-shift multiplex recording/reproducing is performed according to the rotation angle information.

8. The positioning method according to claim 7, wherein the rotation angle information includes an address set in a storage medium moving direction x and an address set in a y direction perpendicular to the storage medium moving direction x, the addresses set in the x direction and the y direction are different, and the rotational angle of the storage medium is determined according to the addresses in the x direction and the y direction.

9. The positioning method according to claim 8, wherein the address includes a plurality of patterns, and when recording/reproducing data, firstly a positioning beam is used to read deviation signals formed by the patterns in the x direction and the y direction to detect whether a recording/reading position is correct, a recording/reading beam is controlled to a correct position according to a position deviation signal, and then recording/reading of the data is started.

10. The positioning method according to claim 9, wherein the correct position is the guide groove or the marker, position deviation is obtained by comparing a light intensity difference of the patterns in the x direction and the y direction respectively, and the light intensity difference on the guide groove or the marker is 0 or a preset value.

11. The positioning method according to claim 6, wherein two-dimensional coordinate information is recorded in advance with marker positions in the area other than the recording/reproducing area.

12. A positioning device for a hologram in a card-type holographic storage medium, comprising:
   a first optical system for recording/reproducing information;
   a translation stage for supporting translation of a storage medium that is engraved with a guide groove in a recording/reproducing area thereof, and markers are provided on the guide groove; and
   a second optical system for generating a positioning beam that is used to position a recording/reading beam generated by the first optical system,
   wherein a recording/reproducing beam and the positioning beam act on the same position of the storage medium, and recording/reproducing of the hologram is performed by adopting the positioning beam to position the recording/reproducing beam at a specific position of the storage medium, and
   wherein the guide groove is in a two-dimensional grid shape, each marker is located at a crossing of the two-dimensional grid, each marker includes at least optical track information and sector information, and the recording/reproducing beam is positioned to a target marker according to the optical track information and the sector information by the positioning beam generated by the second optical system.

13. The positioning device according to claim 12, further comprising a comparator for comparing a position deviation signal read by the positioning beam from a specific position on the storage medium, and driving the translation stage to support the translation of the storage medium according to a deviation signal, so that the positioning beam and the recording/reproducing beam are located at a recording/reproducing position.

14. The positioning device according to claim 13, wherein the position deviation signal is a light intensity difference of the same pattern at a specific position on the storage medium.

15. The positioning device according to claim 12, wherein the translation stage includes an x-direction translation mechanism and a y-direction translation mechanism, in which the x-direction translation mechanism is used for controlling the translation stage to support the storage medium to translate in a shift multiplex moving direction of the storage medium, and the y-direction translation mechanism is used for controlling the translation stage to support the storage medium to translate in a direction perpendicular to the x direction, so that the positioning beam and the recording/reproducing beam are located on the guide groove or the marker.

16. The positioning device according to claim 12, wherein the translation stage also includes a preliminary positioning mechanism that controls the movement of the storage medium such that the positioning beam and the recording/reproducing beam are located at a specific position of the storage medium.

17. The positioning device according to claim 16, wherein the preliminary positioning mechanism is at least one of a translation mechanism, a rotation mechanism, and an inversion positioning mechanism.

* * * * *